(12) United States Patent
Cloutier

(10) Patent No.: US 9,053,398 B1
(45) Date of Patent: Jun. 9, 2015

(54) PASSIVE DETECTION MECHANISMS FOR MAGNETIC CARDS AND DEVICES

(75) Inventor: Bruce S. Cloutier, Jeannette, PA (US)

(73) Assignee: DYNAMICS INC., Pittsburgh, PA (US)

( * ) Notice: Subject to any disclaimer, the term of this patent is extended or adjusted under 35 U.S.C. 154(b) by 257 days.

(21) Appl. No.: 13/208,604

(22) Filed: Aug. 12, 2011
(Under 37 CFR 1.47)

Related U.S. Application Data

(60) Provisional application No. 61/373,114, filed on Aug. 12, 2010.

(51) Int. Cl.
*G06K 19/06* (2006.01)
*G06K 7/08* (2006.01)

(52) U.S. Cl.
CPC .......... *G06K 19/06206* (2013.01); *G06K 7/082* (2013.01)

(58) Field of Classification Search
CPC .......... G06Q 20/341; G06K 19/06187; G06K 19/12; G06K 19/08
USPC ......................................... 235/487, 492, 493
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Paultep Savusdiphol

(57) ABSTRACT

A card exhibiting enhanced operating modes is provided. A normal-operating mode reverts to a low-power mode of operation after a period of inactivity has transpired. The card automatically reactivates in response to a passive detection event during a low-power mode of operation when the card is ready for use.

19 Claims, 4 Drawing Sheets

(56) References Cited

U.S. PATENT DOCUMENTS

| | | |
|---|---|---|
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,929,550 B2 | 8/2005 | Hisada |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparinl et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,557,705 B2* | 7/2009 | Oas .................... 340/568.1 |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0133787 A1* | 7/2004 | Doughty et al. ............... 713/186 |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0001711 A1* | 1/2005 | Doughty et al. ............... 340/5.74 |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |

(56) References Cited

U.S. PATENT DOCUMENTS

| | | |
|---|---|---|
| 2006/0085328 A1 | 4/2006 | Cohen et al. |
| 2006/0091223 A1 | 5/2006 | Zellner |
| 2006/0124756 A1* | 6/2006 | Brown ................ 235/492 |
| 2006/0161435 A1 | 7/2006 | Atef et al. |
| 2006/0161789 A1* | 7/2006 | Doughty et al. ........ 713/186 |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1* | 3/2008 | Ramaci et al. ........... 705/66 |
| 2008/0096326 A1 | 4/2008 | Reed |
| 2008/0126398 A1 | 5/2008 | Cimino |
| 2008/0128515 A1 | 6/2008 | Di Iorio |
| 2008/0140536 A1 | 6/2008 | Ruiz et al. |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0048971 A1 | 2/2009 | Hathaway et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159669 A1* | 6/2009 | Mullen et al. ........... 235/380 |
| 2009/0159672 A1* | 6/2009 | Mullen et al. ........... 235/380 |
| 2009/0159688 A1* | 6/2009 | Mullen et al. ........... 235/487 |
| 2009/0159689 A1* | 6/2009 | Mullen et al. ........... 235/487 |
| 2009/0159690 A1* | 6/2009 | Mullen et al. ........... 235/487 |
| 2009/0159696 A1* | 6/2009 | Mullen ................... 235/493 |
| 2009/0159697 A1* | 6/2009 | Mullen et al. ........... 235/493 |
| 2009/0159698 A1* | 6/2009 | Mullen et al. ........... 235/493 |
| 2009/0159699 A1* | 6/2009 | Mullen et al. ........... 235/493 |
| 2009/0159700 A1* | 6/2009 | Mullen et al. ........... 235/493 |
| 2009/0159701 A1* | 6/2009 | Mullen et al. ........... 235/493 |
| 2009/0159702 A1* | 6/2009 | Mullen ................... 235/493 |
| 2009/0159703 A1* | 6/2009 | Mullen et al. ........... 235/493 |
| 2009/0159704 A1* | 6/2009 | Mullen et al. ........... 235/493 |
| 2009/0159705 A1* | 6/2009 | Mullen et al. ........... 235/493 |
| 2009/0159706 A1* | 6/2009 | Mullen et al. ........... 235/493 |
| 2009/0159707 A1* | 6/2009 | Mullen et al. ........... 235/493 |
| 2009/0159708 A1* | 6/2009 | Mullen et al. ........... 235/493 |
| 2009/0159709 A1* | 6/2009 | Mullen ................... 235/493 |
| 2009/0159710 A1* | 6/2009 | Mullen et al. ........... 235/493 |
| 2009/0159711 A1* | 6/2009 | Mullen et al. ........... 235/493 |
| 2009/0159712 A1* | 6/2009 | Mullen et al. ........... 235/493 |
| 2009/0159713 A1* | 6/2009 | Mullen et al. ........... 235/493 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1* | 10/2009 | Brown et al. ........... 235/493 |
| 2009/0290704 A1 | 11/2009 | Cimino |
| 2009/0303885 A1 | 12/2009 | Longo |
| 2010/0016070 A1 | 1/2010 | Walker et al. |
| 2010/0029301 A1 | 2/2010 | Rhoads et al. |
| 2010/0093421 A1 | 4/2010 | Nyman et al. |
| 2010/0265037 A1* | 10/2010 | Domsten et al. ........ 340/5.82 |
| 2011/0028184 A1 | 2/2011 | Cooper |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

PASSIVE DETECTION MECHANISMS FOR MAGNETIC CARDS AND DEVICES

CROSS-REFERENCE TO RELATED APPLICATION

This application claims the benefit of U.S. Provisional Patent Application No. 61/373,114, titled "PASSIVE DETECTION MECHANISMS FOR MAGNETIC CARDS AND DEVICES," filed Aug. 12, 2010, which is hereby incorporated by reference herein in its entirety.

BACKGROUND OF THE INVENTION

This invention relates to magnetic cards and devices and related systems.

SUMMARY OF THE INVENTION

A card may include a dynamic magnetic communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read-head of a magnetic stripe reader. A magnetic emulator, for example, may communicate data serially to a read-head of the magnetic stripe reader. A magnetic emulator, for example, may communicate data in parallel to a read-head of the magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A dynamic magnetic stripe communications device may be implemented on a multiple layer board (e.g., a two-layer flexible printed circuit board). A coil for each track of information that is to be communicated by the dynamic magnetic stripe communications device may then be provided by including wire segments on each layer and interconnecting the wire segments through layer interconnections to create a coil. For example, a dynamic magnetic stripe communications device may include two coils such that two tracks of information may be communicated to two different read-heads included in a read-head housing of a magnetic stripe reader. A dynamic magnetic communications device may include, for example, three coils such that three tracks of information may be communicated to three different read-heads included in a read-head housing of a magnetic stripe reader.

Input and/or output devices may be included on a card to, for example, facilitate data exchange with the card. For example, an integrated circuit (IC) may be included on a card and exposed from the surface of the card. Such a chip (e.g., an EMV chip) may communicate information to a chip reader (e.g., an EMV chip reader). An RFID antenna or module may be included on a card, for example, to send and/or receive information between an RFID reader and the RFID included on the card.

A card may include a processor that executes one or more operational modes. Each operational mode of the processor may allow the card to operate within a corresponding power consumption mode.

A card may include one or more detectors. Each detector may be configured to, for example, detect events that occur during one or more operational modes of a processor of a card. One or more detectors may be implemented on a card, for example, as single-mode detectors that may detect a single type of event during a particular mode of operation of a processor of a card (e.g., an event occurring during a low-power mode of operation of a processor of a card). One or more detectors may be implemented on a card, for example, as multiple-mode detectors that may detect more than one type of event during a particular mode of operation of a processor of a card (e.g., an event occurring during a low-power mode of operation of a processor of a card and an event occurring during a normal-mode of operation of a processor of a card).

A card may include a timer, for example, to measure an amount of time that a processor lingers within a particular mode of operation. The timer may, for example, be a programmable timer that may be set and/or reset to a programmable count value. A programmable count value of a programmable timer may be selected in response to, for example, a particular mode of operation of a processor of a card and/or a particular type of event occurring during a particular mode of operation of a processor of a card.

A card may include one or more buttons. Activation of one of the buttons may cause a processor of the card, for example, to transition from a first mode of operation to a second mode of operation (e.g., a sleep mode of operation to a normal-mode of operation). A card may include a timer that in response to a button press may, for example, measure an amount of time that a processor of a card lingers in a particular mode of operation (e.g., a normal-mode of operation). If a particular event fails to occur within an amount of time (e.g., twenty seconds) while in a particular mode of operation (e.g., a normal-mode of operation), a processor of a card may transition to a low-power mode, while remaining sensitive to passive ambient events (e.g., an object touching a card or an object located in proximity to a card).

Upon detection of a passive ambient event during a low-power, sensitized mode of operation, a processor of a card may transition to a normal-mode of operation to, for example, actively search for the presence of a device (e.g., a read-head housing of a magnetic stripe reader) for a period of time (e.g., twenty seconds). Once detected, a processor of a card may commence a transaction with the detected read-head housing (e.g., communicate one or more tracks of information to one or more read-heads included in a read-head housing of a magnetic stripe reader).

In the absence of a detection of a device during a normal-mode of operation, a processor of a card may transition back to a low-power, sensitized mode of operation to await a subsequent detection of a passive ambient event. After a prolonged amount of time within a low-power, sensitized mode of operation, or after a threshold number of transitions to a low-power, sensitized mode of operation have occurred, a processor of a card may transition into an alternate low-power mode (e.g., a deep-sleep mode) whereby the card is no longer sensitive to passive ambient events.

A processor of a card may be activated for a normal-mode of operation, but due to a delay in use, may transition to a low-power mode of operation until the card is ready to be used. A card may provide a signal (e.g., a blinking LED) to signify a pending transition from a normal-mode of operation to a low-power, sensitized mode of operation. A card user need not be concerned with extended periods of energy-consuming, non-use after card activation, since a processor of the card may automatically transition to a low-power mode of operation while waiting for use. In doing so, energy used by the card may be reduced, thereby decreasing sensitivity to delays after card activation, but prior to card use.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
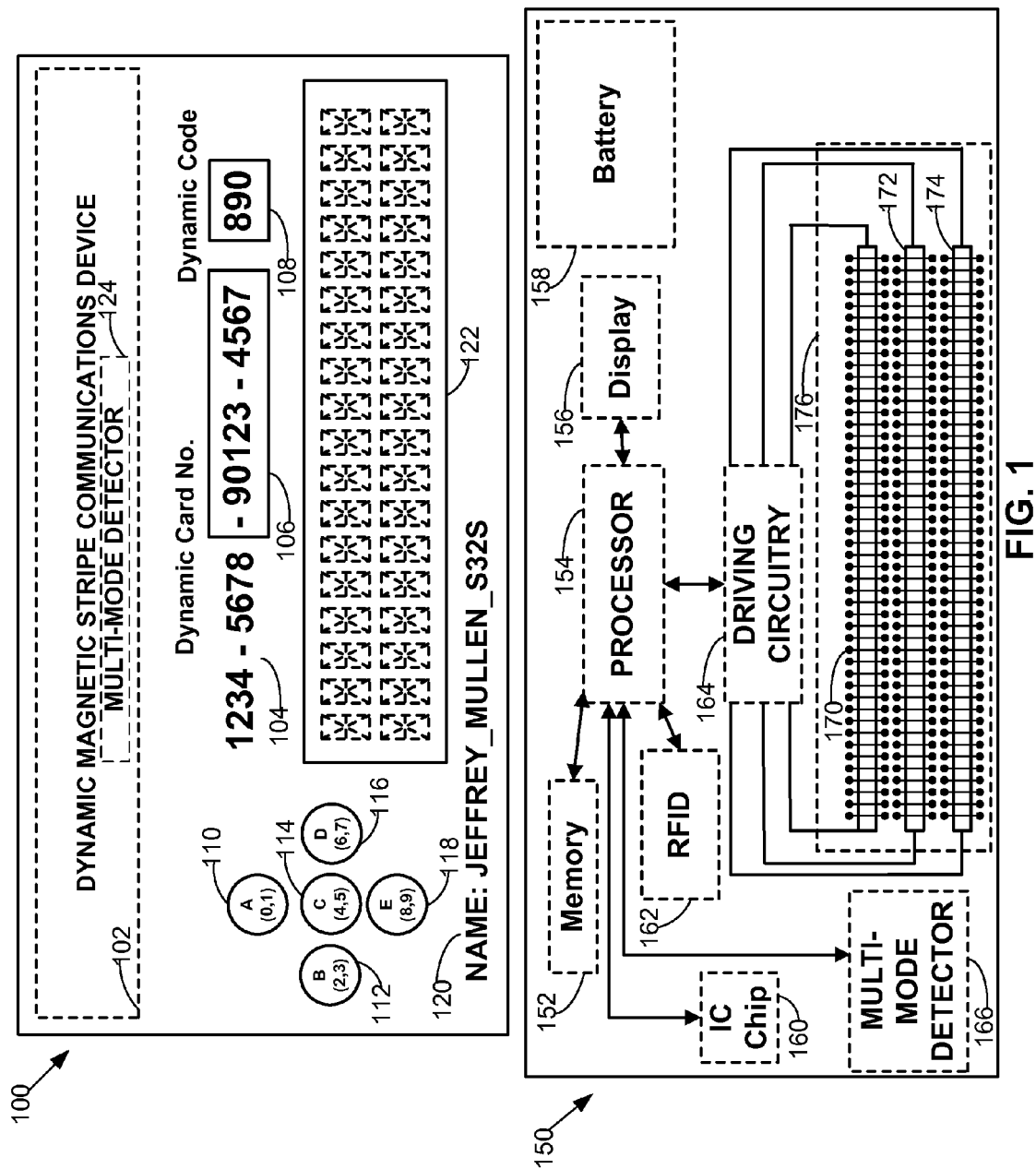
FIG. 1 is an illustration of a card constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, displayed by display 106. Permanent portion 104 may, for example, be incorporated on card 100 so as to be visible to an observer of card 100. For example, labeling techniques, such as printing, embossing, laser etching, etc., may be utilized to visibly implement permanent portion 104.

Card 100 may include a second dynamic number that may be entirely, or partially, displayed via a second display, e.g., display 108. Display 108 may be utilized, for example, to display a dynamic code such as a dynamic security code. Card 100 may include third display 122 that may be used to display graphical information, such as logos and barcodes. Third display 122 may be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a low-power mode and a normal-mode). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by a processor of card 100 as data input.

A processor of card 100 may exhibit one or more modes of operation. Each mode of operation may be associated with a particular power consumption rate. For example, a normal-mode of operation may be activated by manual input (e.g., by pressing one or more of buttons 110-118). A normal-mode of operation may be associated with maximum power consumption, since substantially all functions associated with card 100 may be activated for use during a normal-mode of operation.

A low-power mode of operation (e.g., a deep-sleep mode of operation), for example, may be associated with minimum power consumption, since substantially no functions associated with card 100 may be activated for use during a deep-sleep mode of operation. An activation event (e.g., a button press) may be used to transition a processor of card 100 from a deep-sleep mode of operation to a normal-mode of operation.

An alternate low-power mode of operation (e.g., a sensitized, sleep-mode of operation), for example, may be associated with minimum power consumption. Multi-mode detector 124 may be utilized by card 100 to detect passive ambient activity (e.g., handling of card 100) during a sensitized, sleep-mode of operation. Once passive ambient activity is detected, card 100 may be automatically awakened from a sensitized, sleep-mode of operation to a normal-mode of operation.

A normal-mode of operation of a processor of card 100, for example, may include the detection of a read-head housing of a magnetic stripe reader, where multi-mode detector 124 may, for example, be reconfigured as an active detector (e.g., actively detecting the presence of a read-head housing of a magnetic stripe reader). Once a read-head housing of a magnetic stripe reader is detected, dynamic magnetic stripe communications device 102 may communicate one or more tracks of magnetic stripe data to the magnetic stripe reader.

FIG. 1 shows architecture 150, which may include one or more processors 154. Processor 154 may be configured to utilize memory 152 for dynamically storing information, such as executable machine language, related dynamic machine data, and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes.

One or more displays 156 may be, for example, touch sensitive and/or proximity sensitive. For example, objects such as fingers, pointing devices, etc., may be brought into contact with display 156, or in proximity to display 156. Detection of object proximity or object contact with display 156 may be effective to perform any type of function (e.g., transmit data to processor 154). Display 156 may have multiple locations that are able to be determined as being touched, or determined as being in proximity to an object.

Input and/or output devices may be implemented on architecture 150. For example, integrated circuit (IC) chip 160 (e.g., an EMV chip) may be included on architecture 150 that can communicate information with a chip reader (e.g., an EMV chip reader). Radio frequency identification (RFID) module 162 may be included within architecture 150 to enable the exchange of information between a reader (e.g., an RFID reader) and architecture 150.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power for a period of time (e.g., approximately 2-4 years). Batteries 158 may be rechargeable.

FIG. 1 includes portion 176. Electromagnetic field generators 170-174 may be included within architecture 150 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Processor 154 may include one or more input ports that may be sensitive to a change in signal magnitude (e.g., a change in voltage magnitude). As such, a mode of operation of processor 154 may change in response to a detection (e.g., a software interrupt) of a voltage magnitude change that may be present at one or more input ports of processor 154.

Architecture 150 may include one or more multi-mode detectors 166. One or more multi-mode detectors 166 may be coupled to a corresponding one or more input ports of processor 154. In doing so, for example, a change in voltage magnitude (e.g., a low-to-high voltage transition or a high-to-low voltage transition) present at one more multi-mode detectors 166 may be sensed and communicated to processor 154. In response, processor 154 may transition from one mode of operation to another.

Processor 154 may activate one or more electromagnetic field generators 170-174 to initiate a communications sequence with, for example, one or more read-heads of a magnetic stripe reader. The timing relationships associated with communications between one or more electromagnetic field generators 170-174 and one or more read-heads of a magnetic stripe reader may be provided through use of, for example, passive detection of ambient activity followed by active detection of the magnetic stripe reader.

Figure 2:
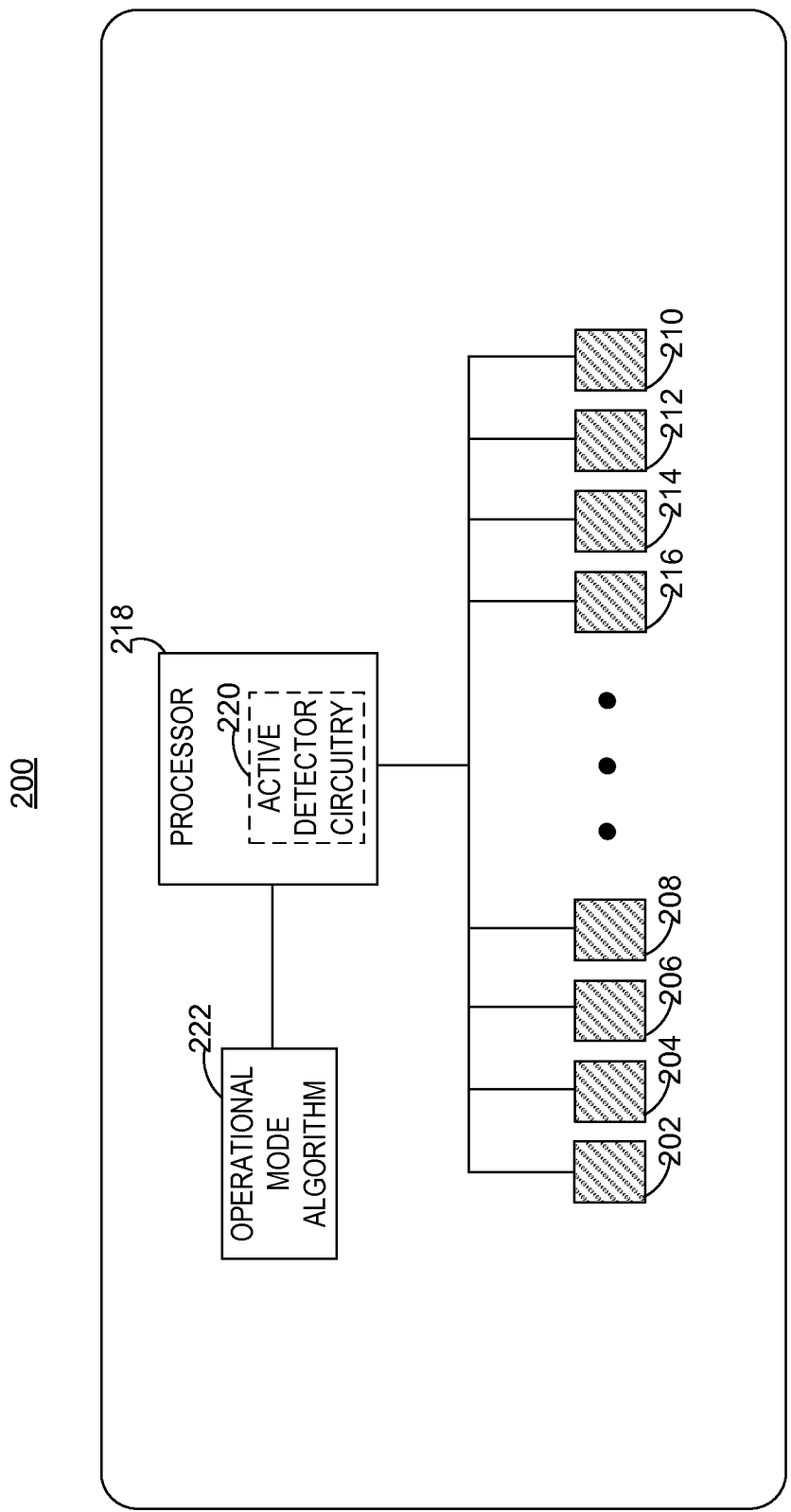
FIG. 2 is an illustration of a card constructed in accordance with the principles of the present invention.

FIG. 2 shows card 200 that may include one or more pads 202-216. For example, pads 202-216 may be provided on a surface of card 200 or may be embedded below one or more layers of lamination. Pads 202-216 may be provided, for example, as conductive pads using an additive technique, whereby patterns of a conductive element (e.g., copper) may be applied to a PCB substrate according to a patterning mask definition layer. Pads 202-216 may be provided, for example, as conductive pads using a subtractive technique whereby patterns of a conductive element (e.g., copper) may be removed from a pre-plated PCB substrate according to an etching mask definition layer. Other non-PCB fabrication techniques may be used to implement conductive pads 202-216 as may be required by a particular application.

Card 200 may include processor 218. Processor 218 may include one or more input ports that may be connected to pads 202-216. In a first mode of operation (e.g., a sensitized, sleep-mode of operation), active detector circuitry 220 of processor 218 may be disconnected from pads 202-216 in response to operational mode algorithm 222 that may be executed by processor 218. The input ports of processor 218 may, for example, be configured to a state (e.g., a high-impedance state) that may be sensitive to signal variations (e.g., voltage variations) that may be present on pads 202-216.

A passive ambient event (e.g., handling of card 200) may cause various objects (e.g., a card user) to vary a property (e.g., the capacitance) of one or more of pads 202-216. In doing so, a voltage magnitude that may be present on pads 202-216 may be caused to vary. Upon detection of such a voltage magnitude variation, for example, processor 218 may transition card 200 from a low-power mode of operation to a normal-mode of operation.

A normal-mode of operation may, for example, include connecting active detector circuitry 220 of processor 218 to one or more pads 202-216 in response to operational mode algorithm 222 that may be executed by processor 218. Active detector circuitry 220 may be utilized by processor 218 to determine when an object is touching or is in the proximity of pads 202-216 via a capacitive sensing technique.

A capacitive sensing technique, for example, may include charging and discharging pads 202-216 through a resistive element that may be provided by active detector circuitry 220. In accordance with the R-C time constant, a time-based capacitance characteristic of pads 202-216 may be determined. By comparing the time-based capacitance characteristic of each pad 202-216 to a threshold capacitance value, a determination may then be made, for example, as to when detectors 202-216 are in a proximity, or touch, relationship to a device whose presence is to be detected (e.g., a read-head housing of a magnetic stripe reader).

Figure 3:
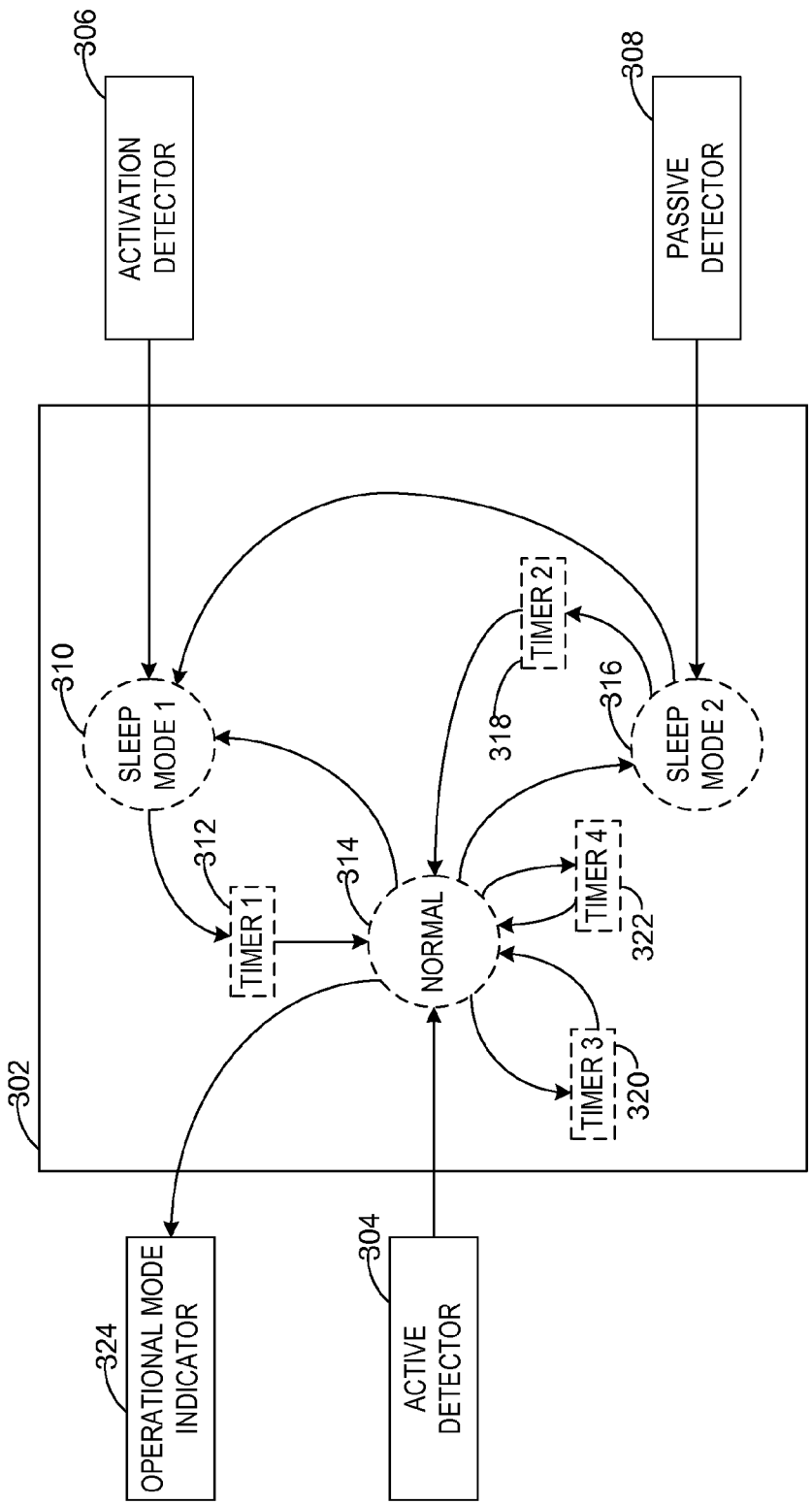
FIG. 3 is an illustration of a system constructed in accordance with the principles of the present invention.

FIG. 3 shows card 300 that may include processor 302, one or more detectors 304-308, and an operational mode indicator 324. Processor 302 may execute instructions (e.g., executable machine language) to implement, for example, an operational mode state machine that may define one or more operational modes of processor 302. State 310 may define a state (e.g., a deep-sleep state) whereby card 300 consumes virtually no power.

Upon receipt of an activation event (e.g., a button press) from activation detector 306, timer 312 may be programmed to a count value that may correspond to a particular amount of time (e.g., 10 seconds). Processor 302 may transition to normal state 314 that may represent, for example, a normal-mode of operation. During a normal-mode of operation, processor 302 may activate operational mode indicator 324 (e.g., an LED) to indicate the normal-mode of operation (e.g., continuous illumination of the LED).

During a normal-mode of operation and for an amount of time defined by timer 312, activities of processor 302 may include actively searching for objects (e.g., a read-head housing of a magnetic stripe reader) that may be in proximity to card 300, or may be touching card 300. Active detector 304 may report such a detection to processor 302. In response, processor 302 may prepare for a transaction (e.g., communication of one or more tracks of information to one or more read-heads included in a read-head housing of a magnetic stripe reader). An amount of time as defined by timer 320, for example, may allocate additional time (e.g., 10 seconds) for processor 302 to linger in a normal-mode of operation should the transaction need to be repeated for any reason. In the event that a transaction is successfully completed, processor 302 may transition back to deep-sleep state 310 to await a subsequent activation event.

Should timer 312 expire before an active detection event occurs and during an amount of time defined by timer 322 (e.g., 10 seconds), processor 302 may activate operational mode indicator 324 (e.g., an LED) to indicate via, for example, an intermittent illumination of the LED, that processor 302 is preparing to enter sleep state 316. Upon expiration of timer 322, sleep state 316 (e.g., a sensitized, low-power mode of operation) may be entered.

In doing so, for example, processor 302 may enter an operational mode whereby card 300 consumes little or no power, but nevertheless remains sensitive to passive ambient events (e.g., handling of card 300) as may be detected by passive detector 308. Accordingly, processor 302 need not linger in normal state 314 while waiting for a transaction to occur, but rather may linger in a low-power mode of operation. As a result, card 300 need not waste energy resources as may be provided, for example, by a non-rechargeable battery on card 300.

Processor 302 may remain in sleep state 316 until, for example, passive detector 308 reports the detection of a passive ambient event, in which case timer 318 may be programmed for an amount of time (e.g., 10 seconds). Processor 302 may then resume actively searching for objects (e.g., a read-head housing of a magnetic stripe reader) that may be in proximity to card 300, or may be touching card 300, as reported by active detector 304 during normal state 314.

Should timer 318 expire before an active detection event occurs and during an amount of time defined by timer 322 (e.g., 10 seconds), processor 302 may activate operational mode indicator 324 (e.g., an LED) to indicate via, for example, an intermittent illumination of the LED, that processor 302 is preparing to re-enter sleep state 316. Upon expiration of timer 322, sleep state 316 (e.g., a sensitized, low-power mode of operation) may be re-entered. A maximum number (e.g., 10) of re-entry cycles into sleep state 316 may be executed before processor 302 may instead require transition into sleep state 310.

Figure 4:
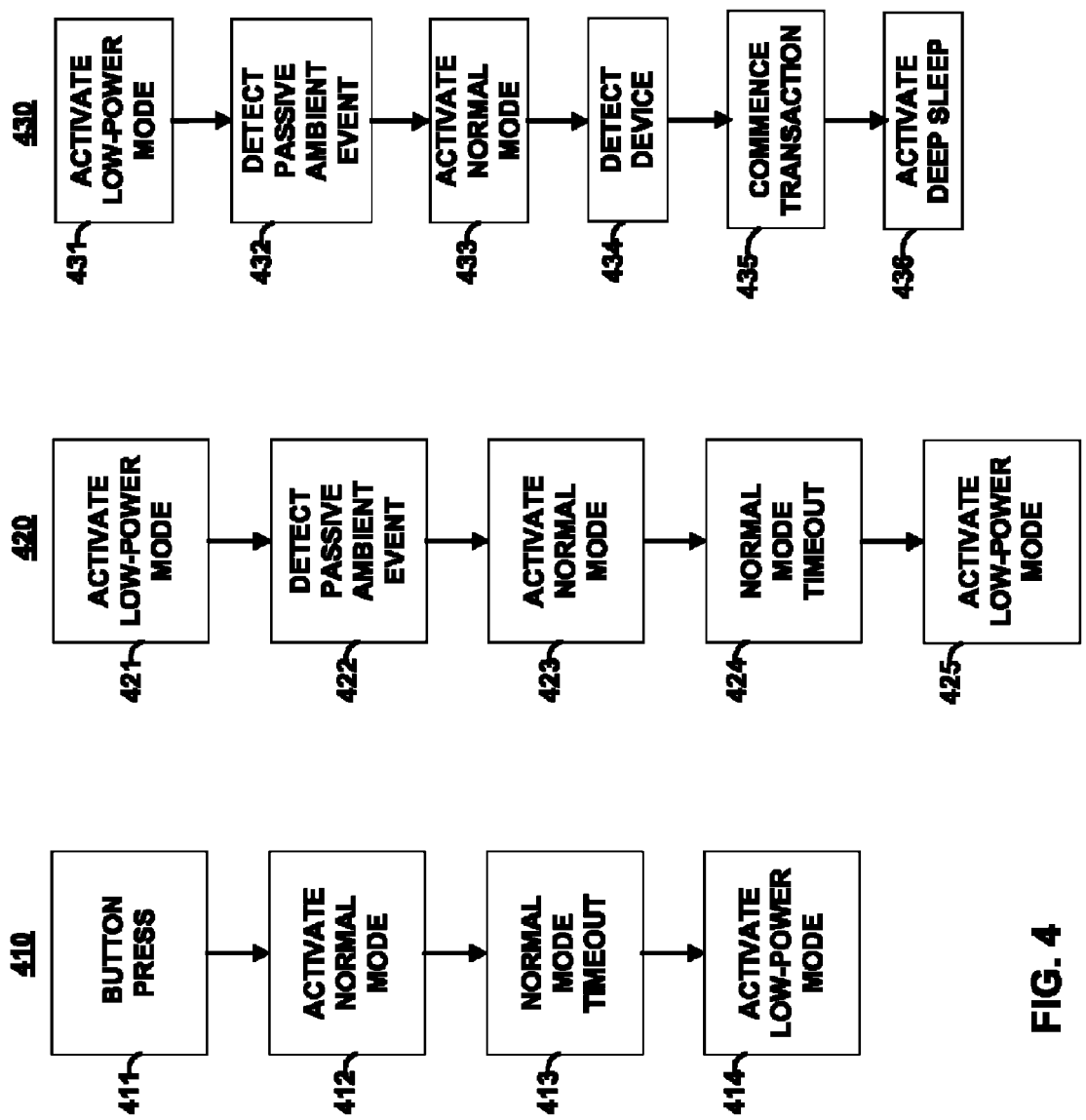
FIG. 4 is an illustration of a process flow chart constructed in accordance with the principles of the present invention.

A flow diagram of a detection/activity operation of a processor of a card is shown in FIG. 4. Step 411 of sequence 410 may initiate a normal-mode of operation of a processor of a card, whereby for example, a button press transitions a processor of a card from a deep-sleep state to a normal-mode of operation. A processor of a card may be fully operational (e.g., as in step 412), whereby an active search activity may be conducted to detect an object that may be in proximity to a card, or that may be touching a card.

After expiration of a normal-mode timeout period (e.g., 20 seconds as in step 413), a card may transition into a low-power mode of operation. In so doing, power consumption of the card may be reduced (e.g., as in step 414) while maintaining sensitivity to passive ambient events.

Activating a low-power, sensitized mode of operation (e.g., as in step 421 of sequence 420), transitions a processor of a card into a mode of operation, whereby a card may achieve substantially the same power consumption rate as is achieved during a deep-sleep mode of operation, while remaining sensitive to passive ambient events (e.g., handling of the card by a card user). In doing so, a processor included within the card may be configured to be sensitive to signal variations (e.g., voltage variations) that may be present at one or more input ports of the processor while expending virtually no power.

Detection of a passive ambient event (e.g., as in step 422) may include interrupting a processor from a deep-sleep state in response to a sensed signal variation at one or more of the processor's input ports. In response, an active search activity (e.g., as in step 423) may be initiated, whereby an active search for objects proximate to or touching the card may be conducted. Since a card may consume more energy during an active search activity, a time-out period (e.g., as in step 424) may be utilized to limit a time duration of an active search activity before activating a low-power, sensitized mode of operation (as in step 425).

Once a processor of a card enters a low-power, sensitized mode of operation (e.g., as in step 431 of sequence 430), passive ambient events may nevertheless be detected (e.g., as in step 432) even though the card may be consuming virtually no power. In so doing, a card's sensitivity to power consumption may be substantially removed during a passive search mode that may be executed by a processor of the card during long periods of non-use of the card (e.g., up to 20 minutes or more of non-use).

Once a passive ambient event is detected, a processor of the card may transition into an active search mode (e.g., as in step 433), whereby objects (e.g., a read-head housing of a magnetic stripe reader) may be detected (e.g., as in step 434). A processor of a card may commence a transaction (e.g., communicate one or more tracks of electromagnetic data to corresponding read-heads of a magnetic stripe reader as in step 435). A processor of a card may remain in a normal-mode of operation to repeat a transaction if necessary. Once a transaction is complete, a card may transition into a deep-sleep mode of operation (e.g., as in step 436), where a processor of the card may no longer be sensitive to passive ambient events.

Persons skilled in the art will also appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A card, comprising:
 a device operable to communicate a track of magnetic stripe data to a read-head of a magnetic stripe reader;
 a first detector operable to detect contact with said card, wherein an activation signal is provided in response to said detected contact with said card; and
 a second detector operable to detect a read-head housing of said magnetic stripe reader in response to said activation signal, wherein said first detector is not a manual data input device operable to receive user input data.

2. The card of claim 1, wherein said second detector is an active detector, and
 said first detector is a passive detector.

3. The card of claim 1, wherein said first detector and said second detector are single-mode detectors.

4. The card of claim 1, further comprising:
 an input device operable to activate a normal-mode of operation,
 wherein a pad of said first detector is operable to actively detect a read-head housing of a magnetic stripe reader in response to said activation of said normal-mode of operation.

5. The card of claim 1, further comprising a processor operable to change between at least three modes of operation.

6. The card of claim 1, further comprising:
 a processor operable to change between at least three modes of operation, wherein each of said modes of operation are associated with a different rate of power consumption.

7. The card of claim 1, wherein said second detector is connected to active detector circuitry, and
said first detector is not connected to active detector circuitry.

8. The card of claim 1, further comprising:
a processor including at least one input port,
wherein said first detector is connected to said at least one input port, and
said processor is operable to detect a change in signal magnitude at said at least one input port and to change operational modes in response to said signal magnitude change.

9. The card of claim 1, further comprising:
a processor including at least one input port,
wherein at least a part of said processor is a portion of said first detector,
at least a part of said processor is a portion of said second detector,
a pad of said first detector is connected to said at least one input port, and
said processor is operable to detect a change in signal magnitude at said at least one input port and to change operational modes in response to said signal magnitude change.

10. A method of using a card, comprising:
activating a search mode to search for a presence of a read-head housing of a magnetic stripe reader during a first time period;
deactivating said search mode during a second time period in response to expiration of said first time period; and
detecting contact with said card during said second time period without using a manual data input device operable to receive user input data,
wherein said search mode is reactivated in response to said detection.

11. The method of claim 10, wherein said activating a search mode includes transitioning a processor to a normal-mode of operation.

12. The method of claim 10, further comprising:
detecting said presence of said read-head housing after said search mode is reactivated; and
preparing for a transaction in response to said detecting said presence of said read head.

13. The method of claim 10, wherein said reactivating said search mode includes transitioning a processor to a normal-mode of operation.

14. The method of claim 10, wherein said deactivating said search mode includes transitioning a processor to a sleep state.

15. The method of claim 10, further comprising:
detecting said presence of said read-head housing after said search mode is reactivated; and
communicating one or more tracks of information.

16. The method of claim 10, further comprising:
detecting said presence of said read-head housing after said search mode is reactivated;
communicating one or more tracks of information to said read head; and
deactivating said reactivated search mode.

17. The method of claim 10, further comprising:
detecting said presence of said read-head housing during a third time period after said search mode is reactivated;
communicating one or more tracks of information to said read head during said third time period; and
deactivating said search mode during a fourth time period in response to expiration of said third time period.

18. The method of claim 10, further comprising:
detecting said presence of said read-head housing during a third time period after said search mode is reactivated;
communicating one or more tracks of information to said read head during said third time period; and
deactivating said search mode during a fourth time period,
wherein said deactivating said search mode during a fourth time period includes transitioning a processor to a deep-sleep state.

19. The method of claim 10, further comprising:
deactivating said reactivated search mode,
wherein said activating said search mode includes transitioning a processor into a normal-mode of operation,
said deactivating said search mode includes transitioning a processor to a low-power sleep state during which passive ambient events are detectable, and
said deactivating said reactivated search mode includes transitioning a processor to a deep-sleep mode of operation during which passive ambient events are not detectable.

* * * * *